United States Patent Office 3,416,079
Patented Dec. 10, 1968

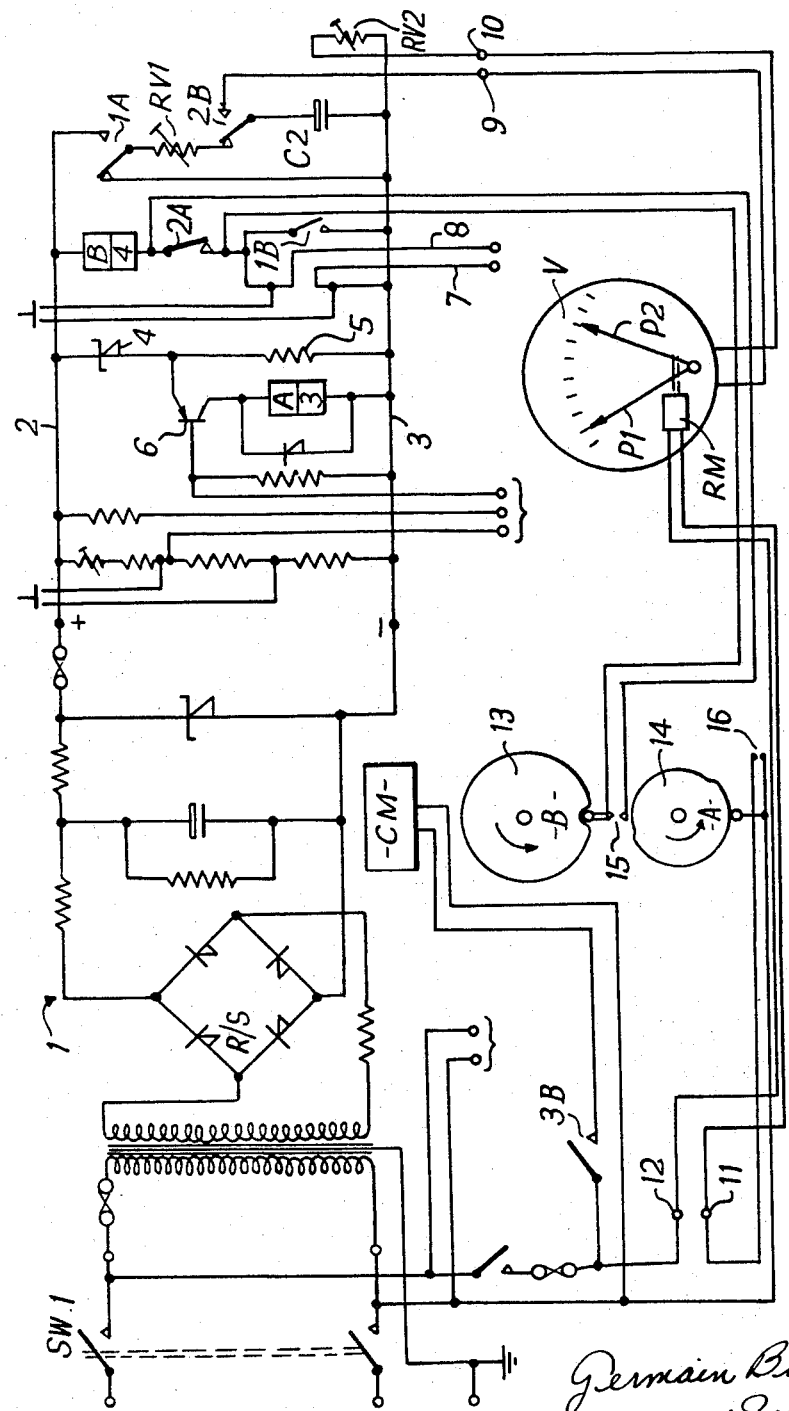

3,416,079
GOLF PRACTICE DEVICES
Germain Burger, London, England, assignor to Easyserve Limited, Liverpool, England
Filed July 5, 1966, Ser. No. 562,606
Claims priority, application Great Britain, July 7, 1965, 28,866/65
7 Claims. (Cl. 324—68)

ABSTRACT OF THE DISCLOSURE

A golf practice device of the kind having a tee, and a screen onto which golf balls are driven from the tee. A timing device comprising a resistance capacitance discharge network is coupled with switches actuated by the golf ball at the tee and at the screen and is connected by suitable automatic switching at the appropriate time to an indicator which registers the charge on the capacitor in terms of the distance the drive would have carried.

The invention concerns golf practice devices of the kind having a tee and a screen a short distance from the tee onto which golf balls are driven. In particular the present invention is concerned with means for measuring and/or recording the time of flight of the golf ball from the tee to the screen.

According to the invention a golf practice device of the kind referred to comprises a first switch actuated by the departure of a ball from the tee, a second switch actuated by the arrival of the ball at the screen, a capacitor, a resistor, registering means and means for initiating on operation of said first switch, the charge or discharge of the capacitor through the resistor and connecting, on operation of the second switch, the registering means across the capacitor to register the charge stored thereon.

Preferably the arrangement is such that on operation of the second switch the capacitor is disconnected from the resistance and connected across the registering means. Preferably the registering means is a voltmeter calibrated in terms of the distance the ball would have travelled on the fairway. A picture of the fairway may be painted or projected on the screen.

Contrary to what might have been expected, experiments with automatic golf club machines have shown that within the angles of projection allowed by golf practice devices of the kind referred to the time of flight of the ball over the first 16 to 24 feet or so, which is the normal range of such devices, and as measured in the experimental manner of a capacitor charge or discharge, is proportional to a high degree of accuracy to the total distance the ball would have travelled on the fairway. This discovery has allowed the provision in accordance with the invention of a remarkably simple yet accurate timing device.

In a preferred embodiment of the invention there is provided a first relay actuated by actuation of said first switch, a second relay actuated by actuation of said second switch, a contact of the first relay connected to one terminal of the resistor and operative when the first relay is actuated to connect said one terminal of the resistor to one terminal of the capacitor and when the first relay is not actuated to connect said one terminal of the resistor to one pole of a direct current supply, and a contact of the second relay connected to the other terminal of the capacitor and operative when the second relay is actuated to connect said other capacitor terminal to one terminal of the registering means and when the second relay is not actuated to connect said other capacitor terminal with the other terminal of the resistor, said one terminal of the capacitor being connected to the other pole of the supply and to the other terminal of the registering means.

The registering means may be a voltmeter having two indicator pointers, one pointer responding instantaneously to the voltage across the capacitor and the other pointer being moved with said one pointer to the extent of the deflection thereof and being left in the deflected position to allow ease of reading, said other pointer being returned to zero after a delay determined by a cam operated switch of which the cam is driven by an electric motor energized in response to actuation of said second relay. Preferably there is provided a further cam operated switch of which the cam is coupled with the aforementioned cam and is effective to hold said second relay actuated for a complete revolution of the cams, an indicator being provided to show when the second relay has been released from actuation and the capacitor is charged.

The first and second switches may be mechanically operated or sound operated (microphone response) but preferably they are photoelectric. The first switch preferably comprises a light source and photo-cell arrangement, the golf ball, when on the tee, being arranged to interrupt or reflect the light beam in its passage to the photo-cell. The second switch preferably includes a number light-source and photo-cell arrangements operating on light beams passing behind a flexible target screen, the breaking of one beam by the screen on impact of the ball being effective to operate the switch.

One embodiment of the invention will hereinafter be described with reference to the accompanying drawing of which the sole figure is a circuit diagram of the timing device according to the invention.

Referring to the figure there is shown a power supply 1 which provides from the A.C. mains a rectified and smoothed D.C. voltage across lines 2 and 3. A Zener diode 4 is connected in series with a resistor 5 to give at the junction point a constant reference potential which is supplied to the emitter of a transistor 6. The collector of the transistor is connected through a relay coil A3 to the line 3 and the base is connected to receive a trigger potential from a photo-electric device (not shown) at the tee. The arrangement is such that if a golf ball is on the tee a light beam to a photocell is interrupted and the photocell at this time provides an operating potential to transistor 6 which makes it conduct and energize relay A3.

Energization of relay A3 moves one of its contacts 1A to the position opposite to that shown in the drawing and thereby charges a capacitor C2 through a resistor RV1 and contact 2B to the potential between lines 2 and 3. Immediately the ball is driven from the tee the light beam strikes the photocell, the transistor 6 is cut off and relay A3 de-energized. Contact 1A changes to the position shown and initiates the discharge of capacitor C2 through resistor RV1.

This discharge is terminated when the ball strikes the screen, for at the screen there is a switch arrangement which connects together leads 7 and 8 when the ball strikes the screen. Since contact 2A is in the position shown this has the effect of energizing the relay B4 which through a self-holding contact 1B stays energized after the momentary impact of the ball on the screen.

Energization of relay B4 changes the position of one of its contacts 2B to the opposite of that shown in the drawing whereby a voltmeter V connected to terminals 9 and 10 is connected across the capacitor C2 in series with a resistor RV2. This allows the voltmeter to receive the remaining charge on C2 which is an indication of time of flight of the ball and therefore an indication of the distance which the ball would have travelled on the fairway. The meter is calibrated in terms of this distance and is clearly visible to the player.

With the arrangement so far described, the voltmeter needle P1 is deflected by the charge on the capacitor to a position representative of the distance the ball would have travelled, but then immediately returns to its zero position. In order to give the player long enough to see the reading there is provided on the meter a second needle P2 which is moved in the forward direction with the first needle but which does not return to zero therewith. In order to return this second needle to zero a reset motor RM is linked thereto, the motor being connected across terminals 11 and 12. As soon as relay B4 is energized one of its contacts 3B connects a cam motor CM across a supply whereupon two gauged cams 13 and 14 start to rotate. Cam 13 operates a switch 15 at all points of its cycle of rotation except its normal rest point, so that once the cam motor starts rotating the cams 13 and 14 comple a cycle before relay B4 is allowed to be de-energized contact 15 being connected across contacts 2A. The contour of cam 14 is such as to allow half a revolution of the cams and therefore provide an adequate delay before the closure of switch 16 which energizes the reset motor. The reset motor is energized for about half the cycle of revolution of the cams and this gives time for the ball to fall away from the screen and be collected by an automatic retrieving device. When the cams have completed their cycle a ball will have been produced at the tee by the retrieving device so that relay A3 will be energized and contacts 1A and 2A will be in positions opposite to those shown, ready for the next drive. However, since relay B4 is still energized, contacts 2B will be in the opposite position to that shown and the charging of the capacitor C2 will not be initiated until contact 15 breaks to de-energize relay B4. At this time a signal is made visible to the player so that he knows he can drive again.

Instead of, or in addition to the voltage of the capacitor being registered on the meter it may be recorded to furnish a permanent record.

Adjustment of RV1 is effective to alter the discharge time of the capacitor and is useful in allowing adjustment of the equipment for different length practice ranges, the potentiometer being calibrated in range length. Adjustment of RV2 allows control of the meter sensitivity.

I claim:

1. A golf practice device comprising a tee; a screen placed a short distance from the tee onto which golf balls are driven from the tee; a first switch actuated by the departure of a ball from the tee; a second switch actuated by the arrival of the ball at the screen; a first relay coupled to said first switch and actuated by actuation of the first switch; a second relay coupled to said second switch and actuated by actuation of the second switch; a direct current supply having two poles; a resistor; a capacitor; a meter capable of registering charge stored on the capacitor; the movable contact of the first relay connected to one terminal of the resistor, a first fixed contact of the first relay coupled to one terminal of the capacitor and a second fixed contact of the first relay coupled to one pole of the current supply, the first relay being operative when actuated to connect said one terminal of the resistor to said one terminal of the capacitor and when not actuated to connect said one terminal of the resistor to one pole of the direct current supply, and the movable contact of the second relay being connected to the other terminal of the capacitor and a first fixed contact of the second relay coupled to the terminal of said meter and a second fixed contact of said second relay coupled to the other terminal of the resistor, the second relay being operative when actuated to connect said other capacitor terminal to one terminal of the registering means and when not actuated to connect said other capacitor terminal with the other terminal of the resistor, said one terminal of the capacitor being connected to the other pole of the supply and to the other terminal of the meter.

2. A device as claimed in claim 1 wherein the meter is a voltmeter calibrated in terms of the distance the ball would have travelled on the fairway.

3. A device as claimed in claim 1 wherein the resistor is a manually adjustable resistor.

4. A device as claimed in claim 1 and a further variable resistor, the meter being connected across the capacitor through said further resistor.

5. A device as claimed in claim 1, wherein the meter is a voltmeter having two indicator pointers, one pointer responding instantaneously to the voltage across the capacitor and the other pointer being moved with said one pointer to the extent of the deflection thereof and being left in the deflected position to allow ease of reading.

6. A device as claimed in claim 5 wherein further comprising a cam operated switch; an electric motor driving the cam, the motor being coupled to said second relay and being energized in response to actuation of said second relay; and means responsive to said cam operated switch for returning said other pointer to zero after a delay determined by the cam operated switch.

7. A device as claimed in claim 6 wherein further comprising a further cam operated switch, the cam of which is coupled with the aforementioned cam, the further cam operated switch being coupled to said second relay and holding said second relay actuated for a complete revolution of the cams, there being provided an indicator arranged to show when the second relay has been released from actuation and the capacitor is charged.

References Cited

UNITED STATES PATENTS

| 1,561,225 | 11/1925 | Fry | 324—68 |
| 1,611,716 | 12/1926 | Brown | 324—68 X |
| 2,021,766 | 11/1935 | Bivens | 324—68 |
| 2,102,166 | 12/1937 | Roberts | 324—68 |
| 2,110,391 | 3/1938 | Davis | 324—103 |
| 2,171,183 | 8/1939 | Lamb | 324—103 X |
| 2,177,569 | 10/1939 | Jorgensen et al. | 324—68 X |
| 2,190,497 | 2/1940 | Whitby et al. | 324—103 |
| 2,599,586 | 6/1952 | Ross | 324—68 |
| 2,626,312 | 1/1953 | Clark et al. | 324—68 |
| 2,933,681 | 4/1960 | Crain | 324—68 |

RUDOLPH V. ROLINEC, *Primary Examiner.*

P. F. WILLE, *Assistant Examiner.*

U.S. Cl. X.R.

324—103